United States Patent [19]

Sasaki et al.

[11] Patent Number: 5,212,428
[45] Date of Patent: May 18, 1993

[54] LIGHTING CIRCUIT FOR VEHICULAR DISCHARGE LAMP

[75] Inventors: Masaru Sasaki; Atsuhiko Murata; Goichi Oda, all of Shimizu, Japan

[73] Assignee: Koito Manufacturing Co., Ltd., Tokyo, Japan

[21] Appl. No.: 765,231

[22] Filed: Sep. 25, 1991

[30] Foreign Application Priority Data

Oct. 1, 1990 [JP] Japan .................................. 2-263300

[51] Int. Cl.⁵ ......................................... H05B 41/36
[52] U.S. Cl. ................................... 315/308; 315/307; 315/224; 315/82
[58] Field of Search ................. 315/307, 308, 224, 82

[56] References Cited

U.S. PATENT DOCUMENTS

| | | |
|---|---|---|
| 3,689,827 | 9/1972 | Quinn . |
| 3,801,794 | 4/1974 | Mauch et al. . |
| 3,999,100 | 12/1976 | Dendy et al. . |
| 4,039,897 | 8/1977 | Dragoset . |
| 4,121,136 | 10/1978 | Fournier et al. . |
| 4,206,385 | 6/1980 | Wisbey . |
| 4,207,500 | 6/1980 | Duve et al. . |
| 4,240,009 | 12/1980 | Paul ..................................... 315/224 |
| 4,337,418 | 6/1982 | Walz . |
| 4,356,433 | 10/1982 | Linden .............................. 315/308 |
| 4,412,156 | 10/1983 | Ota . |
| 4,450,384 | 5/1984 | Krokaugger . |
| 4,667,131 | 5/1987 | Nilssen . |
| 4,678,983 | 7/1987 | Rouzies . |
| 4,763,044 | 8/1988 | Nuckolls et al. . |
| 4,766,350 | 8/1988 | Husgen et al. . |
| 4,797,599 | 1/1989 | Ference et al. . |
| 4,904,907 | 2/1990 | Allison et al. . |
| 4,914,355 | 4/1990 | Mertens et al. . |
| 4,952,849 | 8/1990 | Fellows et al. . |
| 4,992,702 | 2/1991 | Shimizu et al. . |
| 5,049,790 | 9/1991 | Herfurth et al. ..................... 315/291 |
| 5,097,181 | 3/1992 | Kakitani .......................... 315/224 X |

FOREIGN PATENT DOCUMENTS

| | | |
|---|---|---|
| 4002334 | 1/1990 | European Pat. Off. . |
| 2224170 | 4/1990 | European Pat. Off. . |
| 4017415 | 5/1990 | European Pat. Off. . |

Primary Examiner—Eugene R. LaRoche
Assistant Examiner—Son Dinh
Attorney, Agent, or Firm—Sughrue, Mion, Zinn, Macpeak & Seas

[57] ABSTRACT

A lighting circuit for a vehicular discharge lamp comprises a DC-to-AC converter, a lamp voltage detector, a lamp current detector, a voltage-current controller, and a power change reducing means. The DC-to-AC converter converts a DC voltage into an AC voltage and supplies it to the discharge lamp. The lamp voltage detector acquires a detection signal concerning a lamp voltage of the discharge lamp. The lamp current detector acquires a detection signal concerning a lamp current of the discharge lamp. The voltage-current controller produces a lamp current controller instruction signal generated with respect to the lamp voltage upon reception of the detection signal from the lamp voltage detector, and supplies a control signal to the DC-to-AC converter so as to minimize differences between the instruction signal and the detection signal from the lamp current detector, thereby controlling the output voltage of the DC-to-AC converter. This controller has at least a lighting acceleration area for producing the lamp-current control instruction signal to permit supply of greater power than rated power of the discharge lamp and a steady power control area for performing steady power control of the discharge lamp with the rated power, as a control area based on lamp voltage-lamp current characteristic. The power change reducing means suppresses a change in power supply to the discharge lamp with respect to the lamp voltage at a time of transition to the steady power control area from the lighting acceleration area, thereby shortening the time required for flux of light from the discharge lamp to become stable.

8 Claims, 9 Drawing Sheets

LIGHTING CIRCUIT FOR VEHICULAR DISCHARGE LAMP

BACKGROUND OF THE INVENTION

1. Field of the Invention

The present invention relates to a novel lighting circuit for a vehicular discharge lamp. More particularly, this invention pertains to a novel lighting circuit for a vehicular discharge lamp designed to shorten the time needed for the flux of light from a discharge lamp to become stable after energizing the discharge lamp.

2. Description of the Related Art

Compact metal halide lamps have recently been receiving greater attention as a light source for vehicles. Because of slow starting of such metal halide lamps, in order to shorten the startup time, it has been proposed to feed an excessive lamp current several times greater than the steady state lamp current to a discharge lamp immediately after its energization to rapidly warm up the glass bulb, thereby accelerating the lighting action.

Figure 1:
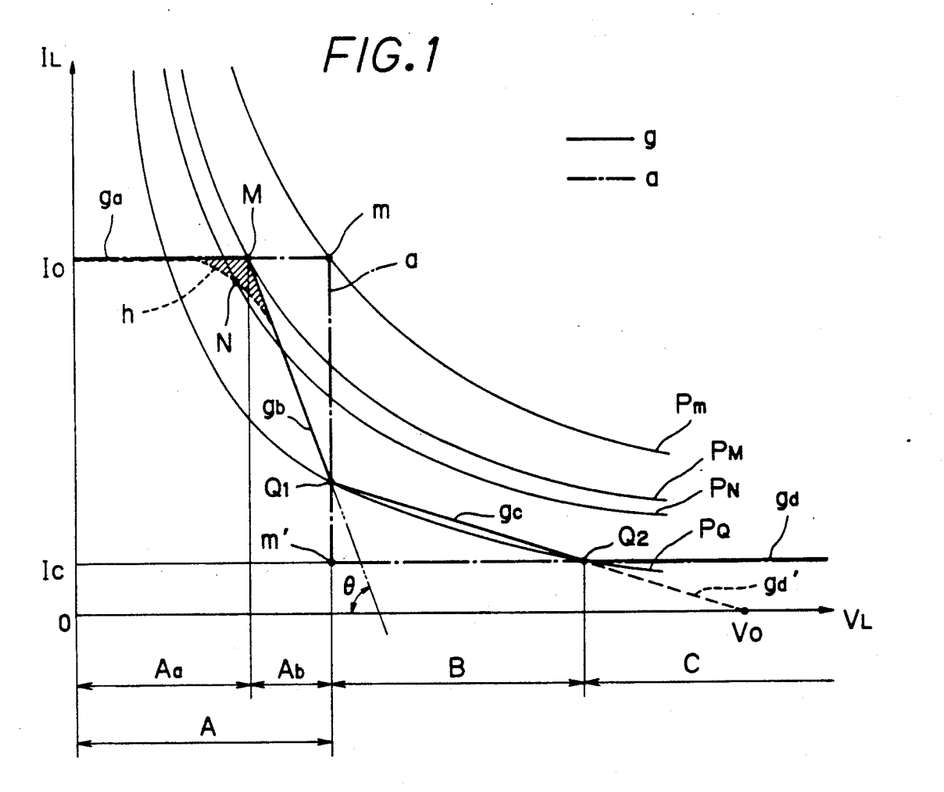
FIG. 1 is a graph showing a lamp voltage vs. lamp current characteristic according to this invention together with a conventional characteristic.

Referring to FIG. 1 a curve a indicated by a dash and dotted line shows an example of control concerning a lamp voltage ($V_L$) and a lamp current ($I_L$) in the case where the lighting of the discharge lamp starts with the glass bulb of the lamp being cold (this event will be hereinafter called "cold starting").

As is apparent from the curve a, when the lamp voltage $V_L$ is low, an excessive current (its effective value is denoted by "$I_o$") flows in an area A reaching a point m and the effective value of the current becomes $I_c$ in an area following the area A after transition from the point m to a point m'.

In this case, with a metal halide lamp with the rated power of 35 W in use as an example, $I_o$ is approximately 5 to 10 times $I_c$.

Incidentally, the hyperbola denoted by "Pm" in FIG. 1 is a steady power line passing the point m.

If an excessive current is applied to the discharge lamp at the beginning of the lighting, the flux of light from the lamp indeed rises very sharply, but applying excessive power to the lamp increases the overshoot or undershoot, thus requiring time for the flux of light from the lamp to become a stable rated level.

Figure 2:
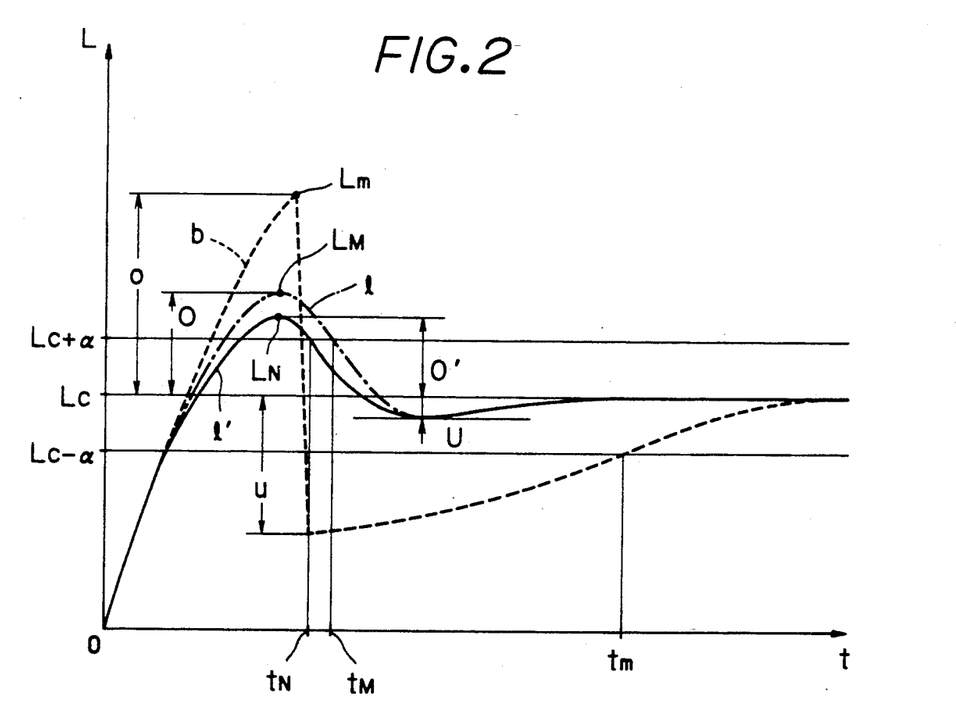
FIG. 2 is a graph schematically representing a time-dependent change in flux of light of a discharge lamp.

A curve b in FIG. 2 indicated by a broken line schematically represents a time-dependent change in flux of lamp light (denoted by "L") corresponding to the $V_L$-$I_L$ control shown by the curve a in FIG. 1 (the time being represented by "t"). The curve b sharply rises from t=0 (the beginning of the lamp lighting taken as an origin) to $L_m$, a peak of the flux of light, has an overshoot o and an undershoot u, and becomes stable later at $L_c$, the rated flux of light.

Here, the "overshoot" is defined as the amount of the flux of light greater than the rated flux of light $L_c$ as a reference, while the "undershoot" is defined as the amount of the flux of light below $L_c$. Further, the time for the flux of light to become stable or "flux stabilizing time" is defined as the time for the flux of light L to converge within $L_c \pm \alpha$ (where $\alpha$ is a value that defines the practical allowable range of the rated flux of light), and the flux stabilizing time for the curve a is denoted by "$t_m$".

As apparent from FIG. 2, when the above-described method of increasing power supplied to the lamp at the beginning of the lamp lighting to shorten the flux stabilizing time is utilized, the overshoot o becomes an excessive value (and at the same time wear-out of the electrodes becomes prominent) when the supplied power is too large. When transition to a steady power control area through the control area A where large power is supplied at the beginning of the lamp lighting is not properly performed, a large undershoot u will occur, making the flux stabilizing time undesirably longer.

SUMMARY OF THE INVENTION

It is therefore an object of the present invention to provide a lighting circuit for a vehicular discharge lamp which comprises a DC-to-AC converting means for converting a DC voltage into an AC voltage and supplying the AC voltage to the discharge lamp; a lamp voltage detector for acquiring a detection signal concerning a lamp voltage of the discharge lamp; a lamp current detector for acquiring a detection signal concerning a lamp current of the discharge lamp; a voltage-current controller for producing an instruction signal to control the lamp current with respect to the lamp voltage upon reception of the detection signal from the lamp voltage detector, and supplying a control signal to the DC-to-AC converting means so as to minimize differences between the instruction signal and the detection signal from the lamp current detector, thereby controlling an output voltage of the DC-to-AC converting means, the voltage-current controller having at least a lighting acceleration area for producing the lamp current control instruction signal to permit supply of greater power than rated power of the discharge lamp and a steady power control area for performing steady power control of the discharge lamp with the rated power, as a control area based on lamp voltage lamp current characteristic; and a power change reducing means for suppressing a change in power supply to the discharge lamp with respect to the lamp voltage at a time of transition to the steady power control area from the lighting acceleration area.

With the above arrangement, a change in power supplied to the discharge lamp during transition to the steady power control area from the lighting acceleration area can be relaxed to permit the flux of light from the discharge lamp to rise very sharply, thus reducing an overshoot at the time the flux of light rises and suppressing an undershoot to thereby shorten the time for the flux of light from the lamp to become stable.

BRIEF DESCRIPTION OF THE DRAWINGS

FIGS. 1 through 3 present graphs for explaining how to perform lighting control in a lighting circuit for a vehicular discharge lamp according to the present invention, of which

FIGS. 4 through 6 illustrate a lighting circuit for a vehicular discharge lamp according to a first embodiment of the present invention, of which

FIGS. 7 and 8 illustrate a lighting circuit for a vehicular discharge lamp according to a second embodiment of the present invention, of which

DETAILED DESCRIPTION OF THE PREFERRED EMBODIMENTS

A lighting circuit for a vehicular discharge lamp embodying the present invention will now be described in detail under the following listed headings.

EMBODIMENTS (FIGS. 1 TO 8)

Controlling Method (FIGS. 1 to 3)
$V_L$-$I_L$ Control Characteristic (FIGS. 1 and 2)
Design Procedures (FIG. 3)

Figure 4:
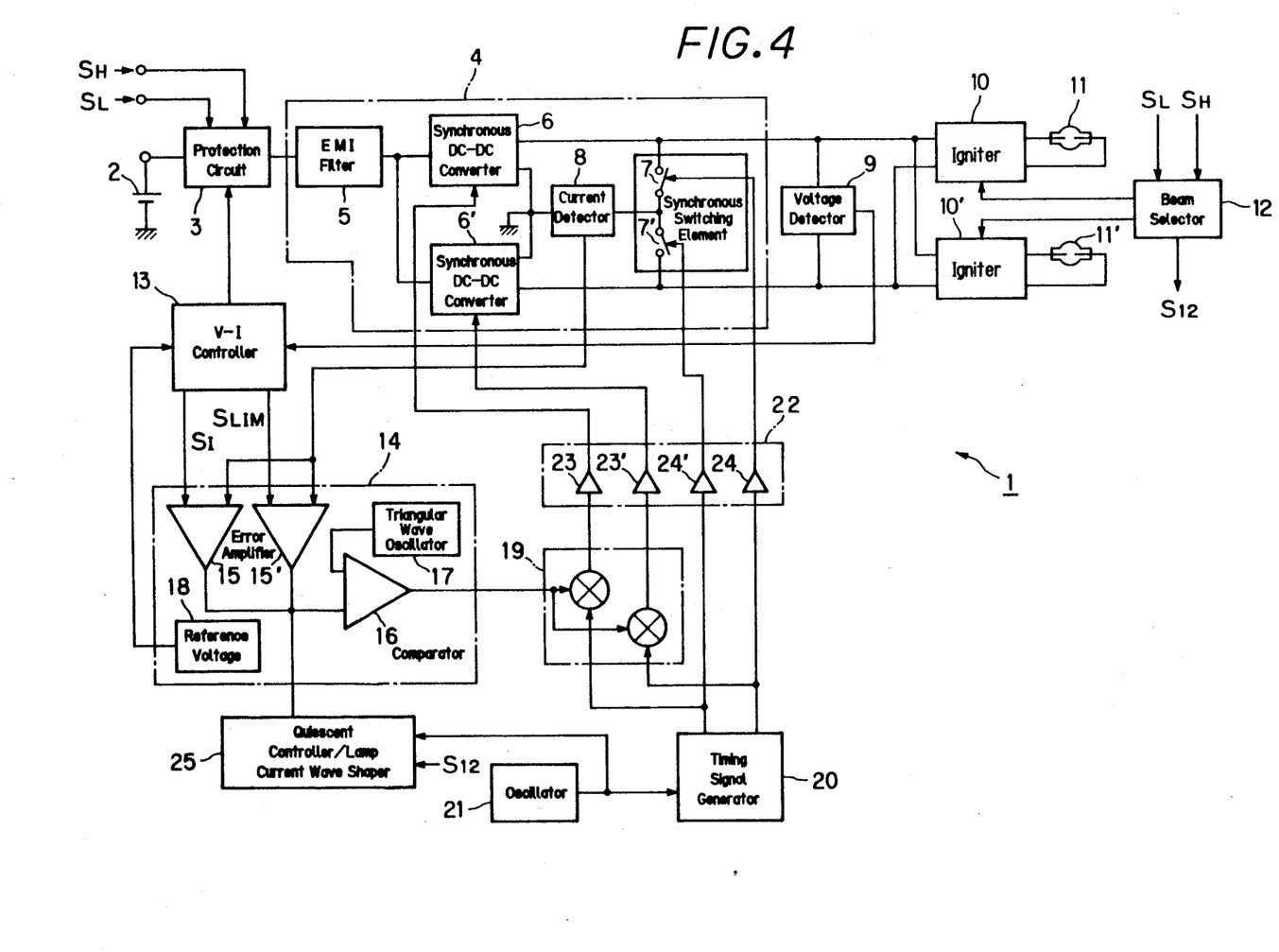
FIG. 4 is a schematic circuit block diagram of the lighting circuit.
Figure 5:
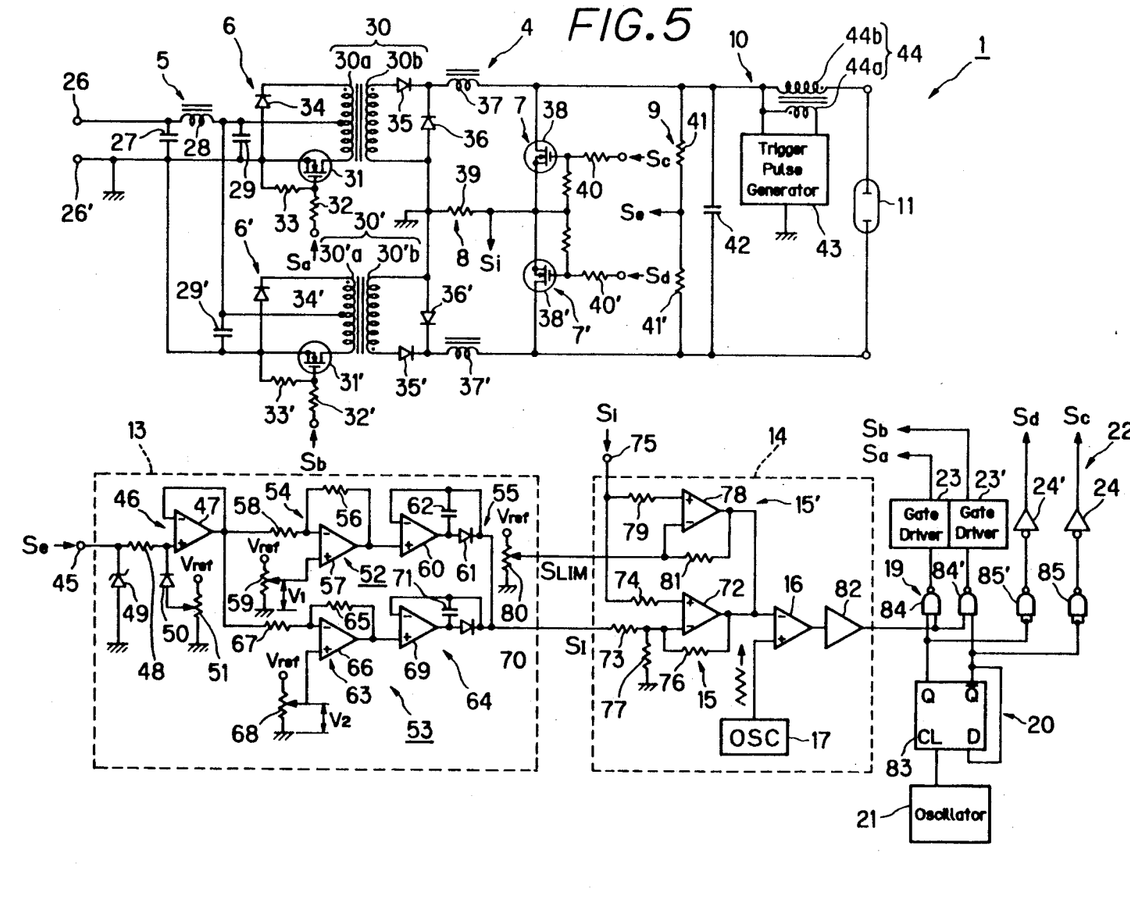
FIG. 5 is a circuit diagram showing essential portions of the lighting circuit.
Figure 6:
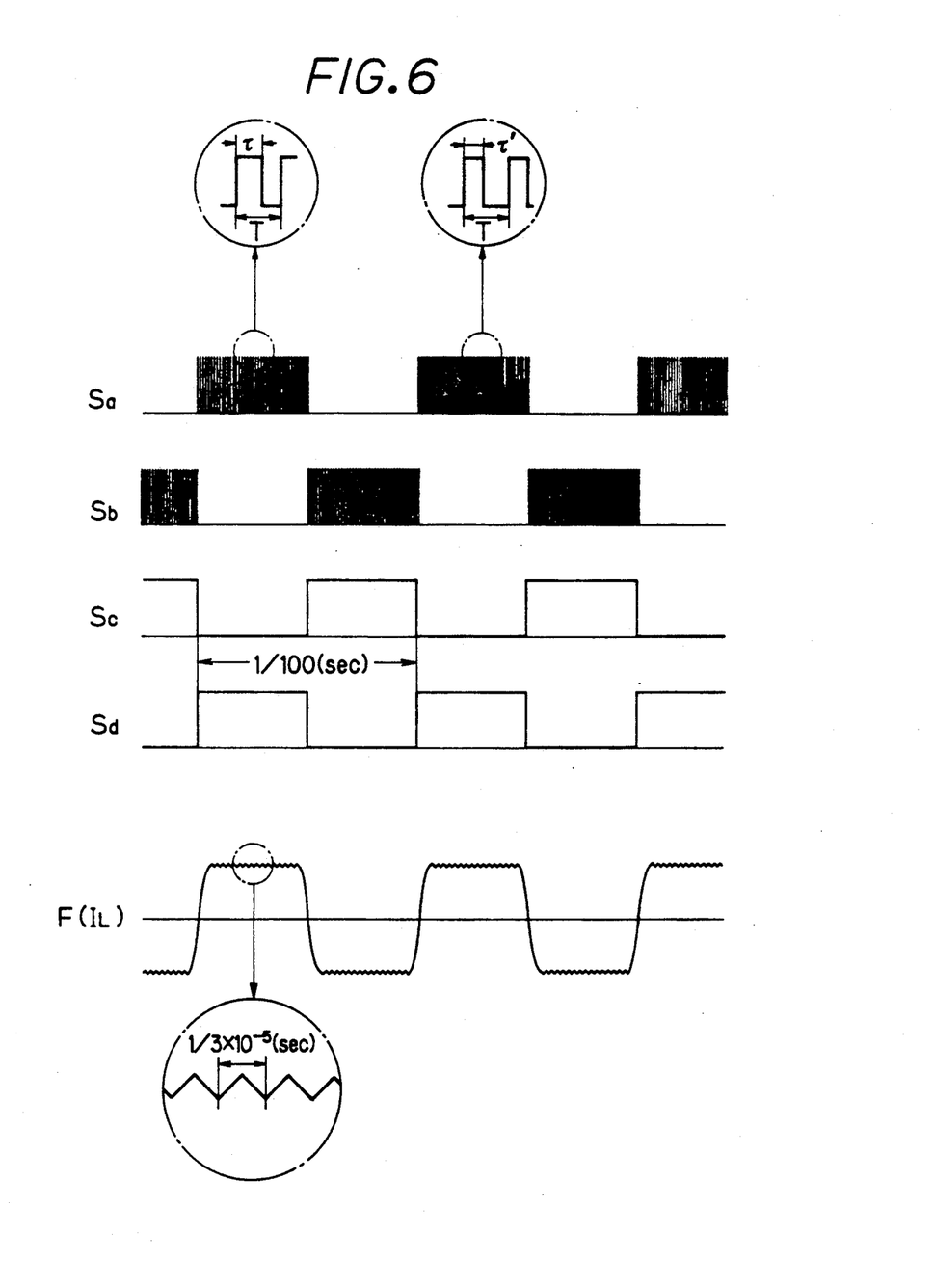
FIG. 6 is a schematic waveform diagram.

FIRST EMBODIMENTS (FIGS. 4 TO 6)

Circuit (FIGS. 4 and 5)
Outline (FIG. 4)
Circuit Structure of Essential Portions (FIG. 5)
Inverter Circuit
Igniter Circuit
V-I Controller
PWM Controller
Timing Signal Generator
Multiplying Section and Driver Circuit
Operation (FIG. 6)
Action

Figure 7:
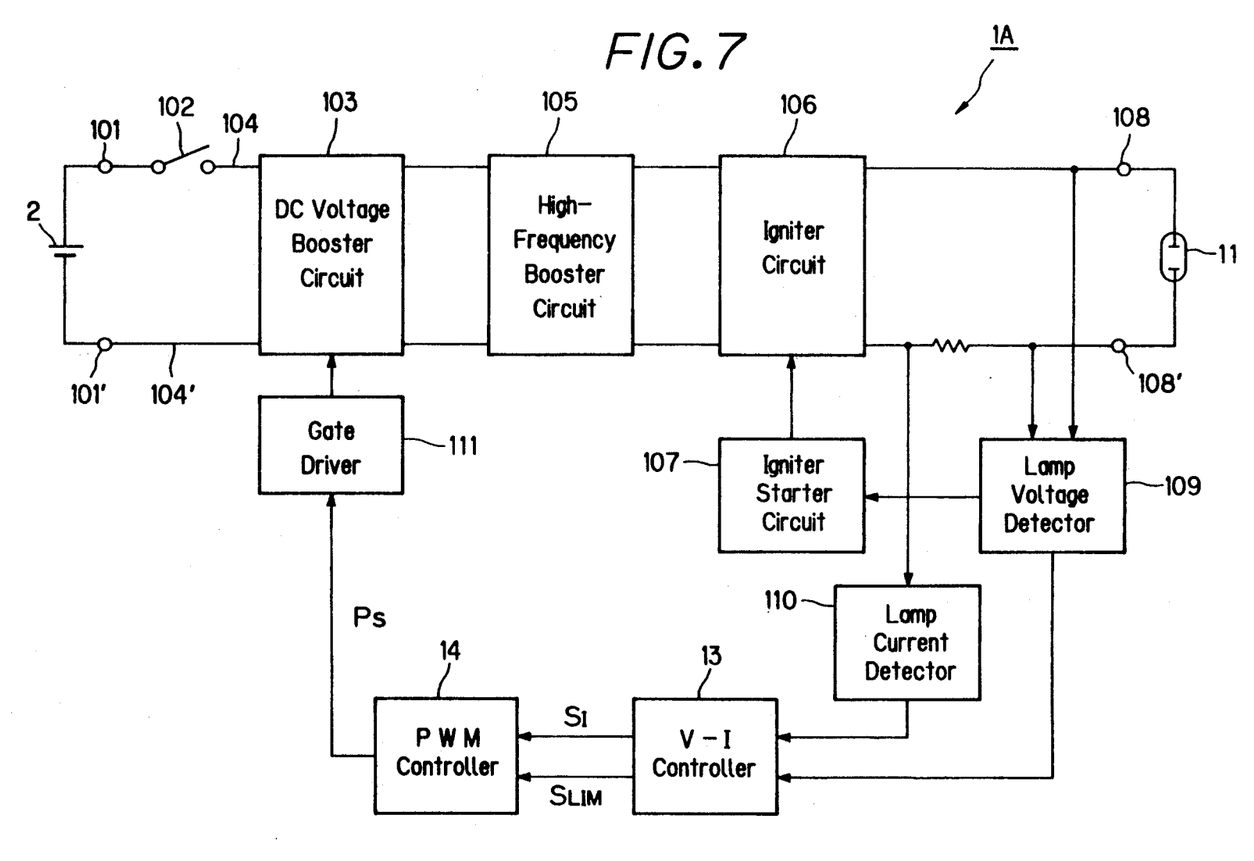
FIG. 7 is a schematic circuit block diagram of the lighting circuit.
Figure 8:
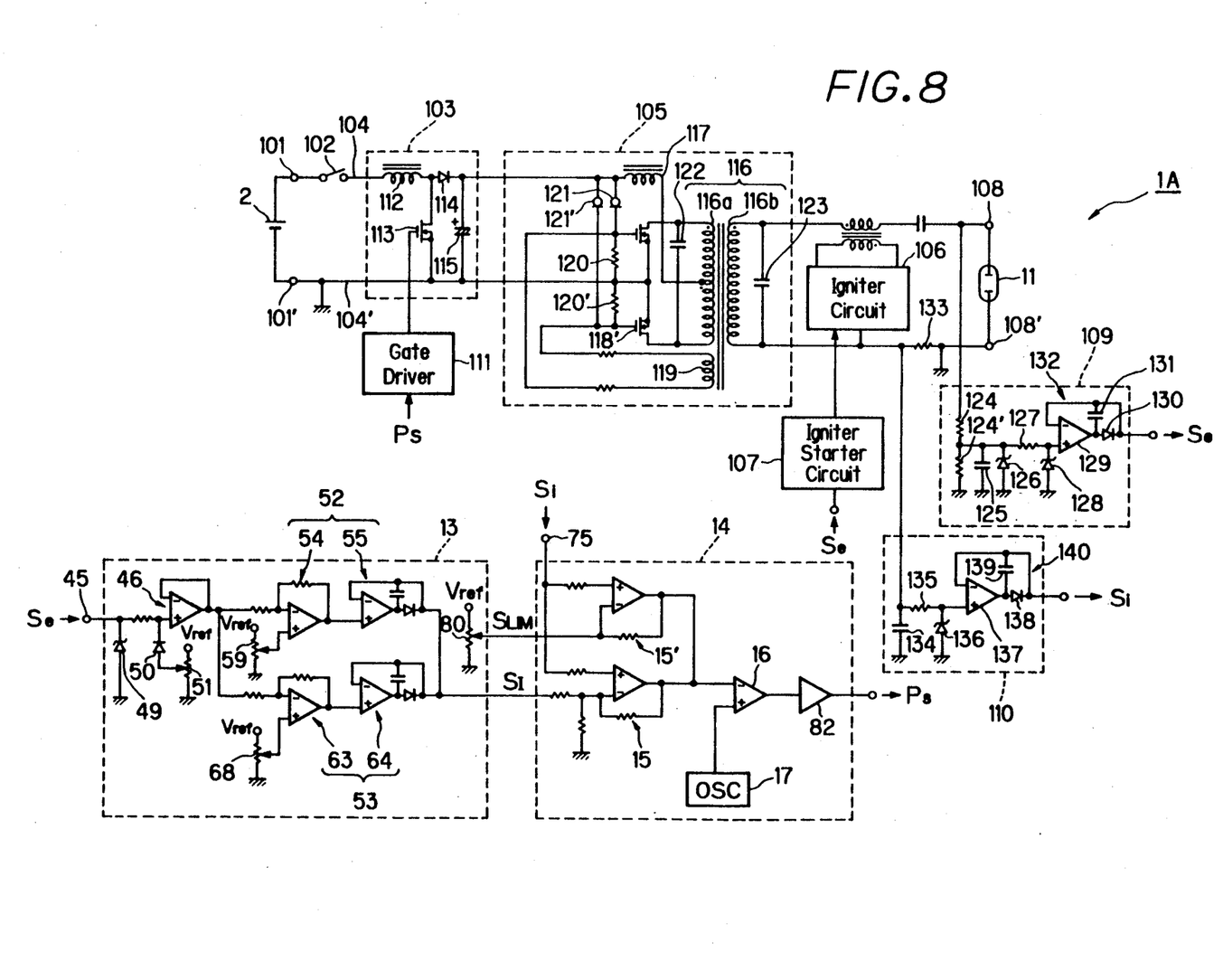
FIG. 8 is a circuit diagram showing essential portions of the lighting circuit.

SECOND EMBODIMENT (FIGS. 7 AND 8)

Outline (FIG. 7)
Circuit Structure of Essential Portions (FIG. 8)
DC Voltage Booster Circuit
High Frequency Booster Circuit
Lamp Voltage Detector
Lamp Current Detector
PWM Controller

EMBODIMENTS (FIGS. 1 TO 8)

Lighting circuits for a vehicular discharge lamp according to illustrated individual preferred embodiments of the present invention will now be described.

Controlling Method (FIGS. 1 to 3)

Before discussing the circuit structure of a lighting circuit 1 for a vehicular discharge lamp, a description will be given of the controlling method or how to define the relation between a lamp voltage $V_L$ and a lamp current $I_L$ to reduce an overshoot and an undershoot to promptly stabilize the flux of light.

$V_L$-$I_L$ Control Characteristic (FIGS. 1 and 2)

FIG. 1 illustrate a curve g in a solid line, which corresponds to the $V_L$-$I_L$ control pattern according to the present invention.

In FIG. 1 a constant current $I_L = I_o$ (see a line $g_a$) flows in an area Aa stretching from $V_L = 0$ to a point M (hereinafter referred to as "lighting acceleration area"), while $I_L$ linearly changes with a given inclination as indicated by a straight line portion $g_b$ in an area Ab extending from the point M to a point $Q_1$ (hereinafter referred to as "transition area").

With the angle between a line extending from the straight line portion $g_b$ and an $V_L$ axis being denoted by $\theta$, the inclination of the straight line portion $g_b$ is given by $-\tan\theta$.

An area B covering from point $Q_1$ to a point $Q_2$ is a steady power area in which a straight line $g_c$ passing $Q_1$ and $Q_2$ is the result of a linear approximation of a steady power curve $P_Q$.

A power value for the steady power curve $P_Q$ is rated power for the discharge lamp, and between this curve $P_Q$ and the steady power curve $P_m$ exist innumerable steady power curves including a steady power curve $P_M$.

In an area C starting from the point $Q_2$, $I_L$ is constant ($I_L = I_c$) irrespective of $V_L$ as indicated by a line $g_d$ for the following reason. Assuming a control curve in the area C is a straight line $g_d'$ extending rightward from the broken line $g_c$ in the area B which represents the linear approximation of the steady power, a cross point $V_o$ between the line $g_c$ and the $V_L$ axis gives the maximum value of the lamp voltage at the time the lamp is activated. Since some lamps need a lamp voltage $V_L$ greater than $V_o$ at the startup time, however, the lamp current is set constant, $I_L = I_c$, in the area C to prevent the control curve from crossing the $V_L$ axis. Accordingly, a high voltage ($>V_o$) is generated at the time the lamp is energized, thereby facilitating the activation of the lamp.

According to the above-described conventional controlling method, the angle between the steady power curve which the curve a crosses during transition from the point m to the point m' and the line m-m' is sharp, and the power changes drastically from m to m'.

As the flux of light from the lamp is generally expressed by a function of supplied power and the temperature of the glass bulb (concerning the light-emitting efficiency), a large power change would result in a large change in the flux of light accordingly.

According to the present invention, therefore, the straight line portion $g_b$ in the area Ab is properly inclined (at an angle $\theta$) to set its inclination, $-\tan\theta$, so that the straight line portion $g_b$ crosses the steady power curve at a small angle from a point M to the point $Q_1$.

The time-dependent change in the flux of light L becomes a curve l as indicated by a dash and dotted line in FIG. 2, and the peak value $L_M$ of the flux of light becomes smaller than the peak value $L_m$ of the curve b. This reduces the overshoot o and undershoot u, making the flux stabilizing time $t_M$ shorter than $t_m$ ($t_M < t_m$).

The smaller the inclination of the straight line portion $g_b$ is, the gentler the power change becomes, but there is a certain limit to making the inclination smaller. In other words, if the inclination decreases, the power in the lighting acceleration area Aa, which is equivalent to the area surrounded by $I_L = I_o$ and the $V_L$ axis, decreases, so that irradiation of the lamp is not sufficiently accelerated, making the flux stabilizing time longer.

In the present invention, there is also a contrivance concerning the control curve at the time of transition from the area Aa to the area Ab.

At the time of transition from the area Aa where the lamp current $I_L$ is constant ($I_o$) to the area Ab expressed by the straight line portion $g_b$, power greatly changes.

This is because the power gets larger as the point moves on the line of $I_L = I_o$ rightward (toward the point M), and decreases as the point moves toward the point $Q_1$ on the straight line portion $g_b$ having the maximum $P_M$ at the point M, causing a change (see the shaded area in FIG. 1) in power in the vicinity of the point M.

In this respect, the transition from the area Aa to the area Ab is controlled to be smooth using a curve h (indicated by a broken line in FIG. 1) which passes a point N on a power curve $P_N$ ($<P_M$).

In other words, a change in power is suppressed by not preventing formation of a sharp corner portion at the cross point M between the line of $I_L=I_o$ and the straight line portion $g_b$ at the boundary between the areas Aa and Ab.

This control causes a change in the flux of light to have a smaller overshoot o' as indicated by a curve l' shown in a solid line in FIG. 2 (peak value $L_N<L_M$), thus further shortening the flux stabilizing time $t_N$ ($t_N<t_M$).

Design Procedures (FIG. 3)

The design procedures concerning the $V_L$-$I_L$ characteristic are illustrated in the $V_L$-$I_L$ characteristic diagrams in FIGS. 3A to 3D, with the use of a metal halide lamp with the rated power of 35 W as an example.

Figure 3A:
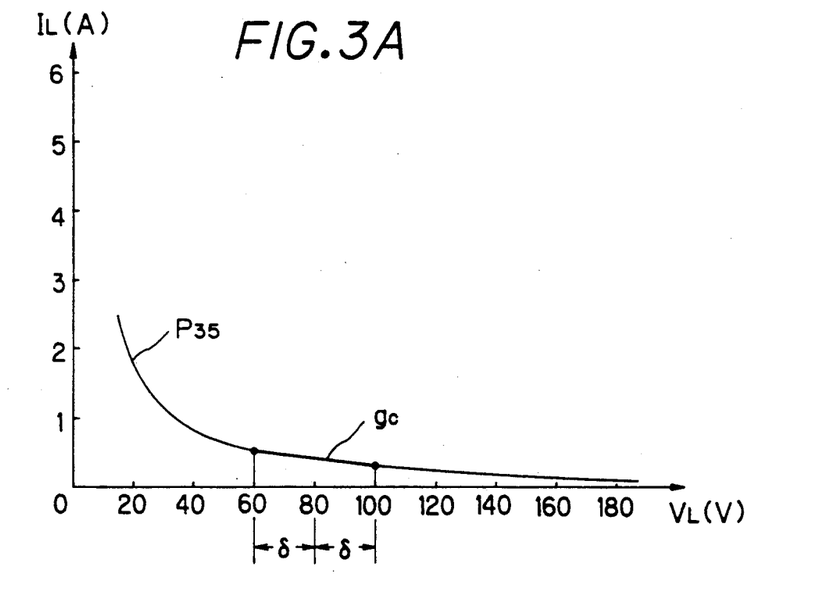
FIGS. 3A to 3D are graphs exemplifying the step-by-step procedures for designing the lamp voltage vs. lamp current characteristic.

(1) Define the $V_L$-$I_L$ relation in the steady power control area B (see FIG. 3A).

First, the steady power control area B is to be defined with a 35-W steady power curve $P_{35}$ as a reference.

To determine the size of the area B, a variation in lamp power should be taken into account.

More specifically, since the lamp voltage at the steady time (which will be denoted by "$V_{LS}$") is not constant due to a variation in quality caused in the production of lamps or a variation in lamp power depending on how long a lamp in question has been used, the steady power control is performed within a range of $\delta$ around $V_{LS}$ (i.e., within a range of $V_{LS}-\delta \leq V_L \leq V_{LS}+\delta$) in light of this point.

For instance, with $V_{LS}=80$ V and $\delta=20$ V, an equation $V_L \cdot I_L = 35$ representing the steady power curve $P_{35}$ is approximated with the range of $60 \leq V_L \leq 100$ using the following linear equation.

$$I_L = k \cdot (V_L - V_o) \tag{I}$$

$$(k = -0.0069, V_o 137.5)$$

The equation I represents the straight line gc.

Figure 3B:
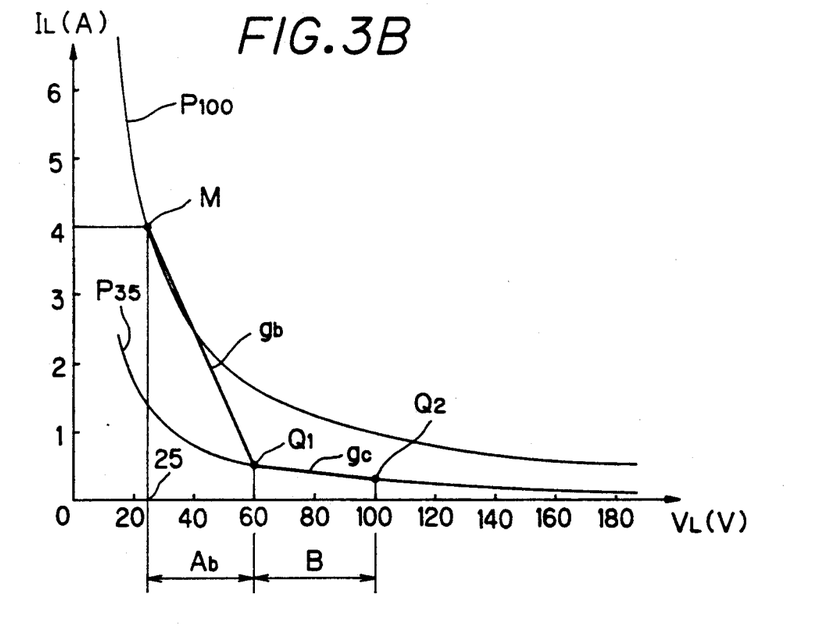

(2) Define the $V_L$-$I_L$ relationship in the transition area Ab (see FIG. 3B).

Now, the inclination of the straight line portion should be determined. First, the right end $Q_1$ of the area Ab is to be determined in such a way that $Q_1$ matches with the left end of the area B.

That is, substituting $V_L=60$ in the equation I yields the point $Q_1$ (60, 0.535).

This point $Q_1$ may be so selected to be in the proximity of a point on a line extending leftward from the steady power approximation line $g_c$.

Then, the left-end point M of the area Ab should be determined; this point is defined by the lamp voltage $V_L$ immediately after the lighting of the lamp and the maximum current ($I_{MAX}$) that can flow through the lamp.

For instance, with $V_L=25$ (V), if $I_{MAX}=4$ (A) (power factor being 1), the point would be M (25, 4) on a 100-W steady power curve $P_{100}$. The straight line passing the points M and $Q_1$ is the straight line $g_b$ (within a range of $25 \leq V_L < 60$) and its inclination is giver by $-\tan\theta \approx 0.1$.

Figure 3C:
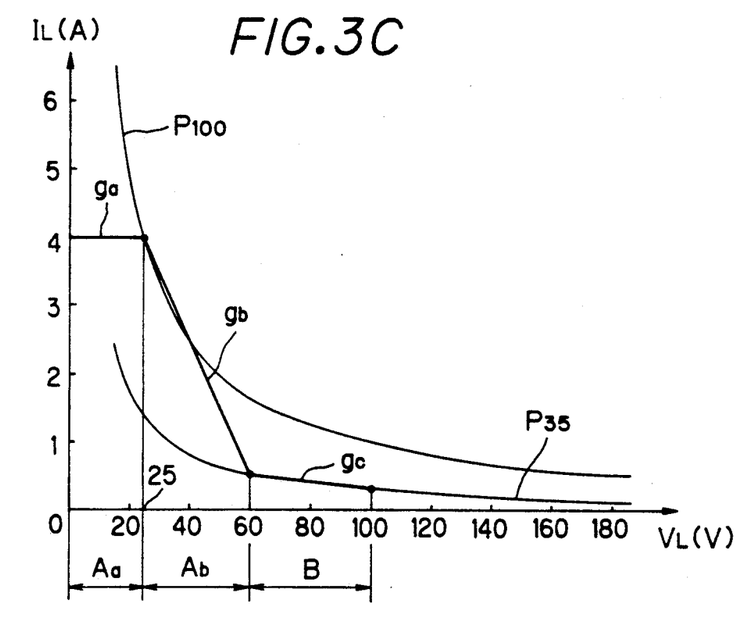

(3) Determine the current value $I_o$ in the lighting acceleration area Aa (see FIG. 3C).

The current value $I_o$ should be set to the maximum current $I_{MAX}$ that does not damage the lamp (e.g., burnout of the electrodes) ($I_o=I_{MAX}$).

How to obtain the broken-lined control curve h shown in FIG. 1 will be described later.

Figure 3D:
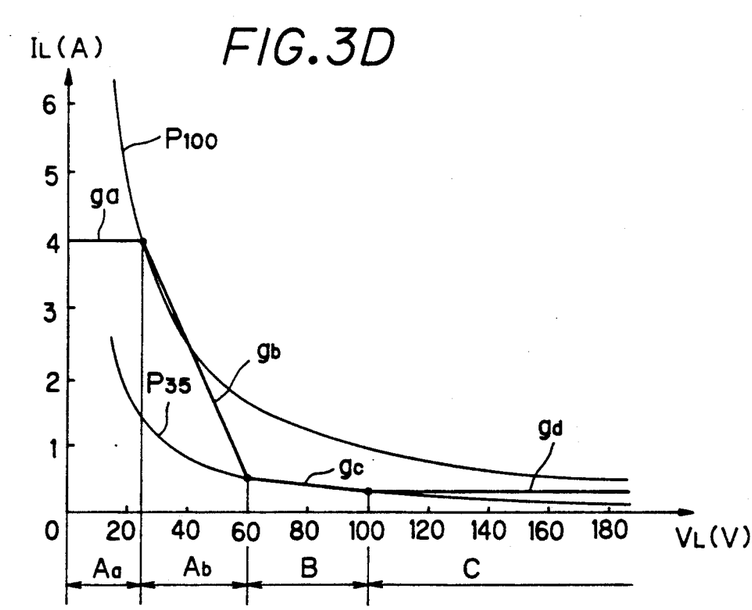

(4) Determine the current value in the area C (see FIG. 3D).

In the constant current area C, the value of $I_c$ is set equal to $I_L \approx 0.26$ (A) which is derived from substitution of $V_L=100$ in the equation I, thus assuring the continuity at the boundary between the areas B and C.

FIRST EMBODIMENT (FIGS. 4 TO 6)

FIGS. 4 through 6 illustrate a lighting circuit for a vehicular discharge lamp according to a first embodiment of the present invention as applied to a lighting circuit 1 for a vehicular metal halide lamp which employs a rectangular-wave lighting system.

Circuit (FIGS. 4 and 5)

FIG. 4 schematically illustrates the lighting circuit 1.

Outline (FIG. 4)

The lighting circuit 1 comprises a battery 2, a protection circuit 3, an inverter circuit 4, a current detector 8, a voltage detector 9, an igniter circuits 10 and 10', a beam selector 12, a V-I controller 13, a PWM controller 14, a timing signal generator 20, and a quiescent controller/lamp current wave shaper 25.

The battery 2 supplies a battery voltage to the inverter circuit 4 through the protection circuit 3.

The protection circuit 3 serves to cut off power supply to the succeeding stages upon reception of a signal indicating an abnormal circuit condition from the V-I controller 13 which will be described later. With the circuit in a normal state, when receiving signals from a lighting switch and a beam select switch, neither shown, ("$S_H$" denoting a signal instructing a high beam and "$S_L$" a signal instruction a low beam), the protection circuit 3 supplies the battery voltage to the inverter circuit 4 in the succeeding stage.

The inverter circuit 4 comprises an EMI filter 5, synchronous DC-DC converters 6 and 6' and synchronous switching elements 7 and 7'.

The synchronous DC-DC converters 6 and 6' are provided in parallel in the succeeding stage of the EMI filter 5 serving to prevent noise, with the synchronous switching elements 7 and 7' (shown by switch symbols in FIG. 4) connected in series between the positive output terminals of the DC-DC converters 6 and 6'.

The boosting ratio of the synchronous DC-DC converters 6 and 6' is controlled by a signal from a driver circuit (to be described later). The reciprocal switching operation of the synchronous switching elements 7 and 7' is controlled by a signal also from the driver circuit but different from the former signal from this drive circuit.

The current detector 8 has one input terminal connected to the ground output terminals of the synchronous DC-DC converters 6 and 6' and grounded, and the other input terminal connected between the synchronous switching elements 7 and 7'.

The voltage detector 9 is provided between the output terminals of the inverter circuit 4 to detect an output voltage thereof.

The igniter circuits 10 and 10' are respectively provided to activate metal halide lamps 11 and 11' both with the rated power of 35 W.

The beam selector 12 serves to selectively operate the igniter circuits 10 and 10' in response to instruction signals $S_H$ and $S_L$, respectively. More specifically, when the instruction signal $S_H$ is input to the beam selector 12, the igniter circuit 10 sends a trigger pulse to the metal halide lamp 11 for a high beam at the beginning of the lighting of the lamp 11, and when the instruction signal $S_L$ is input to the beam selector 12, the igniter circuit 10' sends a trigger pulse to the metal halide lamp 11' for a low beam at the beginning of the lighting of the lamp 11'.

When receiving a detection signal concerning the output voltage of the inverter circuit 4 from the voltage detector 9, the V-I controller 13 computes a current instruction value according to this detection signal and sends out an instruction signal (denoted by "$S_I$") to the PWM controller 14 to be described later. In other words, Since the relationship between the lamp voltage $V_L$ and the lamp current $I_L$ is designed in advance to become the control curve which has been described earlier with reference to FIG. 1, the V-I controller 13 performs such control as to permit the flow of the lamp current $I_L$ according to the detection signal concerning the output voltage of the inverter circuit 4. The V-I controller 13 also sends out a signal (denoted by "$S_{LIM}$") to limit the lamp current $I_L$ not to become an excessive value ($I_L > I_o$) at the beginning of the lamp lighting to the PWM controller 14.

The PWM controller 14 comprises two error amplifiers 15 and 15', a comparator 16, a triangular wave oscillator 17 and a reference voltage generator 18.

One of the error amplifiers 15 receives the instruction signal $S_I$ from the V-I controller 13 and a detection signal from the current detector 8, while the other error amplifier 15' receives the current limit signal $S_{LIM}$ from the V-I controller 13 and the detection signal from the current detector 8.

An analog OR signal originating from ORing the output signals of the error amplifiers 15 and 15' is applied to one input terminal of the comparator 16 which receives at the other input terminal a triangular wave pulse from the triangular wave oscillator 17. The comparator 16 compares the received signals with each other and sends its output signal representing the comparison result to a multiplying section 19.

The reference voltage generator 18 serves to provide a stable voltage which is not affected by a change in battery voltage, and sends the stable voltage to individual circuit sections (V-I controller 13, etc.).

The timing signal generator 20 frequency-divides a rectangular wave pulse signal from an oscillator 21, and produces two timing signals of opposite phases. These signals are supplied to the multiplying section 19 to be multiplied by the output signal of the comparator 16, and the resultant signals are respectively sent through gate drivers 23 and 23' of a driver circuit 22 to become control signals for the respective synchronous DC-DC converters 6 and 6'. The two timing signals from the timing signal generator 20 are also respectively supplied unmultiplied through buffers 24 and 24' of the driver circuit 22 to become control signals for the respective synchronous switching elements 7 and 7'.

The quiescent controller/lamp current wave shaper 25 has its output terminal OR-connected to the output terminals of the error amplifiers 15 and 15', so that it can control the quiescent period of the output signal of the PWM controller 14 to relax the inclination of the edge of the rising (or falling) of the lamp current in response to the signal from the oscillator 21, and temporarily set the output voltage of the PWM controller 14 to zero upon reception of a beam select signal (denoted by "$S_{12}$") from the beam selector 12. That is, the duty cycle of the output signal of the comparator 16 is determined by the output signals of the error amplifiers 15 and 15' and the quiescent controller/lamp current wave shaper 25.

Circuit Structure of Essential Portions (FIG. 5)

FIG. 5 gives a detailed illustration of essential portions of the lighting circuit 1. For diagrammatic simplification and easier understanding of the circuit function, FIG. 5 shows only one of the igniter circuit pair, namely, the high-beam igniter circuit 10, and its associated metal halide lamp 11, and omits the other circuit portions concerning a low beam, because the former elements function in the same way as the latter elements (one has only to replace the igniter circuit 10 with the circuit 10' and replace the metal halide lamp 11 with the lamp 11').

Inverter Circuit

In FIG. 5, reference numerals "26" and "26'" denote DC voltage input terminals to which the battery voltage is applied through the protection circuit 3, the former being a positive terminal and the latter a ground terminal.

The inverter circuit 4 includes a capacitor 27 inserted between the DC voltage input terminals 26 and 26' and a coil 28 having one end connected to the input terminal 26. The inverter circuit 4 is divided into two systems in the subsequent stage of the coil 28, with a capacitor 29 inserted between power lines of one system and a capacitor 29' inserted between power lines of the other system. Those circuit elements constitute the $\pi$ type EMI filter 5.

Forward type converters are used for the synchronous DC-DC converters 6 and 6' as illustrated, so that the desired boosting ratio can be acquired by altering the duty cycle of the control pulse applied to an active switching element provided on the primary winding side of each of transformers.

A transformer 30 having a primary winding 30a and a secondary winding 30b in phase constitutes the synchronous DC-DC converter 6. The center tap of the primary winding 30a is connected to the positive terminal of the capacitor 29.

An N channel FET 31 has its drain connected to the winding-finishing end of the primary winding 30a, and its source connected to the ground terminal of the capacitor 29. The FET 31 receives at its gate a control signal (denoted by "Sa") from a gate driver (to be described later) via a resistor 32. This signals Sa controls the switching operation of the FET 31.

A resistor 33 is connected between the gate and source of the FET 31. A diode 34 has its cathode connected to the winding-starting end of the primary winding 30a and its anode connected to the source of the FET 31.

Diodes 35 and 36 are provided on the side of the secondary winding 30b of the transformer 30, the diode 35 having an anode connected to the winding-starting end of the secondary winding 30b and the diode 36 having an anode connected to the winding-finishing end of the secondary winding 30b. Those diodes 35 and 36 have their cathodes connected together to one end of a coil 37.

The synchronous DC-DC converter 6' has the same structure as the above-described synchronous DC-DC converter 6, except that a transformer constituting the converter 6' has its primary winding and secondary winding in opposite phases.

A transformer 30 having a primary winding 30a and a secondary winding 30b in phase constitutes the synchronous DC-DC converter 6. The center tap of a primary winding 30'a of a transformer 30' is connected to the positive terminal of the capacitor 29'. An N channel FET 31' has its drain connected to the winding-finishing end of the primary winding 30'a, and its source connected to the DC voltage input terminal 26'.

The gate of the FET 31' is supplied with a control signal (denoted by "Sb") from another gate driver (which will also be described later) via a resistor 32'.

A resistor 33' is connected between the gate and source of the FET 31'. A diode 34' has its cathode connected to the winding-starting end of the primary winding 30'a and its anode connected to the source of the FET 31'.

Diodes 35' and 36' are provided on the side of the secondary winding 30'b of the transformer 30', the diode 35' having an anode connected to the winding-starting end of the secondary winding 30'b and the diode 36' having an anode connected to the winding-finishing end of the secondary winding 30'b. Those diodes 35' and 36' have their cathodes connected together to one end of a coil 37'.

The anodes of the diodes 36 and 36' are both grounded.

N channel FETs 38 and 38' are respectively used for the synchronous switching elements 7 and 7', and are connected in series between the output-side ends of the coils 37 and 37'.

In other words, one of the FETs, 38, corresponds to the synchronous switching element 7, and the other FET 38' to the synchronous switching element 7', and the FETs 38 and 38' have their drains respectively connected to the output-side ends of the coils 37 and 37', with their sources both grounded via a resistor 39. The gates of the FETs 38 and 38' are supplied with signals from the respective buffers of the driver circuit (to be described later) respectively via resistors 40 and 40', the signals respectively denoted by "Sc" and "Sd".

The resistor 39 corresponds to the current detector 8 and a current detection signal (denoted by "Si") acquired from one end (on the source side of the FETs 38 and 38') of the resistor 39 is sent to the PWM controller 14.

Voltage-dividing resistors 41 and 41', constituting the voltage detector 9, are provided in parallel to the FETs 38 and 38'. These resistors 41 and 41' provide a voltage detection signal (denoted by "Se") which is to be sent to the V-I controller 13.

A capacitor 42 is provided in parallel to the voltage dividing resistors 41 and 41'.

Igniter Circuit

The igniter circuit 10 comprises a trigger pulse generator 43 and a trigger transformers 44.

The trigger transformer 44 has its primary winding 44a connected to the output stage of the trigger pulse generator 43 and its secondary winding 44b provided on the power feeding line to the metal halide lamp 11. At the time the activation of the lamp 11 starts, the igniter circuit 10 operates in response to the signal from the beam selector 12 to generate a trigger pulse, which is in turn applied to the lamp 11 after boosted by the trigger transformer 44.

V-I Controller

The V-I controller 13 has an input terminal 45 to which the voltage detection signal Se provided by the voltage dividing resistors 41 and 41' is applied. The V-I controller 13 comprises a voltage buffer 46, a Zener diode 49, a diode 50, and circuits 52 and 53 of double systems which have the identical structure.

The voltage buffer 46 is constituted of an operational amplifier 47, which has a non-inverting input terminal connected via a resistor 48 to the voltage detection signal input terminal 45 and an inverting input terminal connected to its own output terminal.

The Zener diode 49 has a cathode connected to the input terminal 45, with its anode grounded.

The diode 50 has its cathode connected to the non-inverting input terminal of the operational amplifier 47, and its anode connected to a movable terminal of a variable resistor 51. To this variable resistor 51 is applied a reference voltage (denoted by "$V_{ref}$") produced by the reference voltage generator 18.

The output of the voltage buffer 46 is input to the error amplifier 15 through the double-system circuits 52 and 53 having the same structure as mentioned above.

The circuit 52 serves to perform power control in the transition area Ab, and includes a differential amplifier 54 and an ideal diode circuit 55 located in the succeeding stage thereof.

The differential amplifier 54 is constituted of a negative-feedback operational amplifier 57 whose inverting input terminal is connected via a resistor 58 to the output terminal of the operational amplifier 47. The non-inverting input terminal of the operational amplifier 57 is supplied with a predetermined voltage ($V_1$) which is provided by adjusting a variable resistor 59 based on the reference voltage $V_{ref}$.

The ideal diode circuit 55 includes an operational amplifier 60, a diode 61 and a capacitor 62. The operational amplifier 60 has its output terminal connected to the anode of the diode 61, and its inverting input terminal connected to the cathode of the diode 61, with the capacitor 62 inserted between the output terminal and the inverting input terminal. The non-inverting input terminal of the operational amplifier 60 is connected to the output terminal of the differential amplifier 54.

The circuit 53 serves to perform power control in the steady power control area B, and includes a differential amplifier 63 and an ideal diode circuit 64 located in the succeeding stage thereof.

The differential amplifier 63 is constituted of a negative-feedback operational amplifier 66 (the negative-feedback is made by a register 65) whose inverting input terminal is connected via a resistor 67 to the output terminal of the voltage buffer 46. The non-inverting input terminal of the operational amplifier 66 is supplied with a voltage ($V_2$) which is provided by adjusting a variable resistor 68 based on the reference voltage $V_{ref}$.

The ideal diode circuit 64 includes an operational amplifier 69, a diode 70 and a capacitor 71. The operational amplifier 69 has its output terminal connected to the anode of the diode 70, and its inverting input terminal connected to the cathode of the diode 70, with the capacitor 71 inserted between the output terminal and the inverting input terminal. The non-inverting input terminal of the operational amplifier 69 is connected to the output terminal of the differential amplifier 63.

PWM Controller

The PWM controller 14 comprises an operational amplifier 72 constituting the error amplifier 15, a feedback resistor 76, a resistor 77, an operational amplifier 78 constituting the error amplifier 15', a feedback resistor 81, the aforementioned comparator 16, the aforementioned triangular wave oscillator 17, and a buffer 82.

The operational amplifier 72 has an inverting input terminal connected via a resistor 73 to the output terminals of the ideal diode circuits 55 and 64 (i.e., the cathodes of the diodes 61 and 70), so that this inverting input terminal receives the instruction signal $S_I$. The operational amplifier 72 has a non-inverting input terminal connected via a resistor 74 to an input terminal 75 through which the current detection signal Si is supplied.

The feedback resistor 76 is inserted between the inverting input terminal and output terminal of the operational amplifier 72, while the resistor 77 is inserted between that inverting input terminal and a ground line.

The operational amplifier 78 has a non-inverting input terminal connected via a resistor 79 to the input terminal 75 to receive the current detection signal Si. The operational amplifier 78 also has an inverting input terminal to which a predetermined voltage (corresponding to the current limit signal $S_{LIM}$) is applied. This predetermined voltage is acquired by adjusting a variable resistor 80 based on the reference voltage $V_{ref}$.

The feedback resistor 81 is provided between the inverting input terminal and output terminal of the operational amplifier 78.

The output terminals of the operational amplifiers 72 and 78 are connected to the negative input terminal of the comparator 16. That is, the output terminals of the error amplifiers 15 and 15' are connected in the form of an analog OR to the comparator 16.

The comparator 16 receives at its positive input terminal a triangular wave pulse from the triangular wave oscillator 17, which has a basic frequency of about 300 KHz. The output of the comparator 16 is sent to the multiplying section 19 via the buffer 82.

Timing Signal Generator

The timing signal generator 20 comprises a D flip-flop 83, which has its D input terminal connected to its $\overline{Q}$ output terminal to thereby substantially constitute a T flip-flop. The flip-flop 83 has its clock input terminal supplied with a rectangular wave signal from the oscillator 21, which has a basic frequency of 200 Hz.

Multiplying Section and Driver Circuit

The multiplying section 19 comprises two-input NAND circuits 84 and 84' each having one input terminal supplied with the output signal (PWM signal) of the PWM controller 14. The NAND circuit 84 has the other input terminal supplied with the Q output of the flip-flop 83, while the NAND circuit 84' has the other input terminal supplied with the $\overline{Q}$ output of the flip-flop 83.

The output signals of the NAND circuits 84 and 84' are supplied through the gate drivers 23 and 23' as the control signals Sa and Sb to the FETs 31 and 31' of the inverter circuit 4, respectively.

Reference numerals "85" and "85'" denote NOT circuits each constituted of a two-input NAND circuit. The NOT circuit 85 has both input terminals connected to the $\overline{Q}$ output terminal of the flip-flop 83, while the NOT circuit 85' has both input terminals connected to the Q output terminal of the flip-flop 83. The output signals of the NOT circuits 85 and 85' are supplied through the buffers 24 and 24' as the control signals Sc and Sd to the synchronous switching elements 7 and 7', respectively.

Operation (FIG. 6)

The operation of the lighting circuit 1 will now be described.

To begin with, a description will be given of the power supply path to the metal halide lamp 11 (11').

When the lighting switch (not shown) is activated, the battery voltage is input to the synchronous DC-DC converters 6 and 6', which constitute the inverter circuit 4.

The switching operations of the FETs 31 and 31' of the synchronous DC-DC converters 6 and 6' are respectively controlled by the control signals Sa and Sb from the gate drivers 23 and 23', thereby controlling the output voltages of the converters 6 and 6'.

The switching operations of the synchronous switching elements 7 and 7' are reciprocally controlled by the control signals Sc and Sd from the buffers 24 and 24', respectively. More specifically, when the switching element 7' (FET 38') is rendered ON with the switching element 7 (FET 38) in an OFF state, a current path of the coil 37→secondary winding 44b of the trigger transformer 44→lamp 11→FET 38'→resistor 39 is formed to select the output of the synchronous DC-DC converter 6 as the output of the inverter circuit 4, and when the switching element 7 (FET 38) is set ON with the switching element 7'→(FET 38') in an OFF state, a current path of the coil 37'→secondary winding 44b of the trigger transformer 44→lamp 11→FET 38→resistor 39 is formed to select the output of the synchronous DC-DC converter 6' as the output of the inverter circuit 4.

A rectangular wave voltage acquired by this alternate operation of the synchronous DC-DC converters 6 and 6' is supplied to the metal halide lamp 11 (11').

This situation is schematically illustrated in the waveform diagram in FIG. 6 in which Sa, Sb, Sc and Sd are the aforementioned control signals and $F(I_L)$ is the waveform of the lamp current.

As is apparent from the diagram, the control signals Sa and Sb have high-frequency waveforms, which have duty cycles determined by the v-I controller 13 and are repeated in a period of 1/100 (sec). The signals Sa and Sb have a phase difference of 180°.

The control signals Sc and Sd have rectangular waveforms with basic frequencies of 100 Hz and opposite phases, Sc forming a pair with Sb and Sd forming a pair with Sa.

The waveform F(IL) of the lamp current has a high-frequency wave signal (300 KHz) superimposed on a low-frequency rectangular waveform (100 Hz).

The operation concerning the V-I control will be described below.

It is the diode 50 and variable resistor 51 that are involved in the control in the lighting acceleration area Aa.

When the lamp voltage $V_L$ is low and the voltage detection signal Se has a low voltage level, the diode 50 is rendered conductive to make the output of the voltage buffer 46 constant. It is the error amplifier 15' that determines the upper limit of the lamp current in the area Aa, and PWM control is performed so that the difference between the voltage value of the current detection signal Si at the beginning of the lighting of the lamp and the reference voltage determined by the variable resistor 80 becomes zero.

As the level of the voltage detection signal becomes large, the voltage across the diode 50 enters the non-linear area in the forward voltage-current characteristic of the diode 50, yielding the control curve h at the time of transition from the area Aa to the area Ab. In other words, the curve h is realized by utilizing the non-linearity of the diode characteristic.

The circuit 52 produces a control signal associated with the straight line portion $g_b$ in the transition area Ab, and the output signal of the ideal diode circuit 55, which corresponds to the difference between the voltage level of the voltage detection signal Se coming through the voltage buffer 46 and the reference level $V_1$ is sent to the error amplifier 15. More specifically, the output signal of the ideal diode circuit 55 is the instruction signal $S_I$ that specifies the lamp current $I_L$ that should flow with respect to the lamp voltage $V_L$, and this signal $S_I$ is compared with the current detection signal Si corresponding to the actual lamp current $I_L$ in the error amplifier 15. As a result, a PWM wave having a duty pulse according to the difference between those two signals is produced by the comparator 16 and triangular wave oscillator 17. This PWM wave is multiplied by low-frequency rectangular waves from the oscillator 21 and flip-flop 83 in the NAND circuits 84 and 84' of the multiplying section 19, respectively, to be the control signals Sa and Sb after passing the gate drivers 23 and 23'.

Control in the steady power control area B should be easily understood because the circuit 53 which realizes this control has the same structure as the above-described circuit 52.

The output signal of the ideal diode circuit 55, or the instruction signal $S_I$ concerning the lamp current, is sent to the error amplifier 15 and is compared with the current detection signal Si corresponding to the actual lamp current $I_L$ there. PWM control is performed in such a way as to set the difference between those two signals to zero. More specifically, a PWM wave acquired by the comparator 16 and triangular wave oscillator 17 is multiplied by low-frequency rectangular waves from the timing signal generator 20 in the multiplying section 19, thereby providing the control signals Sa and Sb.

The control curve becomes linear as indicated by the equation I, and this linear portion is an approximation of the steady power curve $P_{35}$.

The circuit portion concerning the area C is the Zener diode 49 provided in the preceding stage of the voltage buffer 46.

As should be understood from the cathode of the Zener diode 49 being connected between the frequency-dividing resistors 41 and 41', when the lamp voltage $V_L$ is large and the level of the corresponding voltage detection signal Se increases, the input voltage of the voltage buffer 46 will not exceed the Zener voltage of the Zener diode 49 (denoted by "$V_Z$") and the output voltage of the voltage buffer 46 will become constant ($V_Z$).

The point of transition from the area B to the area C is the time when the voltage level of the detection signal concerning the output voltage of the inverter circuit 4 becomes equal to the Zener voltage $V_Z$.

As far as the V-I control operation at the time of cold start concerns, power control immediately after activation of the lighting switch is conducted based on the control curve in the area C; thereafter, the transition from the area Aa to the area Ab occurs and the control eventually enters the steady power control area B. In other case than the cold start, the transition from the area Ab to the area B occurs or the control immediately enters the area B in accordance with the lamp-OFF duration from the deactivation of the lamp to re-lighting of the lamp.

Action

According to the above-described lighting circuit 1, control is performed in such a manner that excessive power exceeding the rated power is supplied to the metal halide lamp in the lighting acceleration area Aa at the beginning of the lamp lighting to accelerate the rising of the flux of light from the lamp, and the steady power curve and straight line $g_b$ lying in the transition area Ab for transition to the stable steady power control area C cross each other at a gentle inclination. This control suppresses an overshoot and undershoot at the rising of the flux of light from the lamp, thus shortening the flux stabilizing time.

SECOND EMBODIMENT (FIGS. 7 AND 8)

FIGS. 7 and 8 illustrate a lighting circuit for a vehicular discharge lamp according to a second embodiment 1A of the present invention as applied to a lighting circuit of a sine-wave lighting system.

Those portions of the structure of the second embodiment 1A which have the same functions as the corresponding portions in the first embodiment will be given by the same reference numerals to avoid repeating their redundant description.

Outline (FIG. 7)

FIG. 7 illustrates the general structure cf the lighting circuit 1A only for a single metal halide lamp for diagrammatic simplification.

The lighting circuit IA comprises a battery 2, a lighting switch 102, a DC voltage booster circuit 103, a high frequency booster circuit 105, an igniter circuit 106, an igniter starter circuit 107, a lamp voltage detector 109, a lamp current detector 110, a V-I controller 13, and a PWM controller 14.

The battery 2 is connected to DC voltage input terminals 101 and 101'.

The lighting switch 102 is provided on a positive line 104 which connects the positive terminal of the DC voltage booster circuit 103 and the DC voltage input terminal 101 (i.e., to the positive terminal of the battery 2). A ground line 104' connects the other input terminal of the DC voltage booster circuit 103 and the DC voltage input terminal 101'.

The high frequency booster circuit 105 converts the DC output voltage of the DC voltage booster circuit 103 into a sinusoidal AC voltage and outputs the latter.

The igniter circuit 106 generates a trigger pulse in response to a signal from the igniter starter circuit 107 at the time the lamp 11 is activated, superimposes this pulse on the AC output of the high frequency booster circuit 105, and applies the resultant signal to the metal halide lamp 11 connected to AC output terminals 108 and 108'.

The lamp voltage detector 109 frequency-divides the lamp voltage applied between the AC output terminals 108 and 108', and then rectifies the resultant voltage, thereby yielding a detection signal Se concerning the lamp voltage $V_L$. This signal Se is supplied to the V-I controller 13 and the igniter starter circuit 107.

The lamp current detector 110 performs voltage conversion of the lamp current, and then rectifies the resultant voltage, thereby yielding a detection signal Si concerning the lamp current $I_L$. This signal Si is supplied to the V-I controller 13.

The V-I controller 13 outputs an instruction signal to the PWM controller 14, and a control signal produced by the PWM controller 14 (or a PWM wave denoted by "PS") is fed back via a gate driver 111 to the DC voltage booster circuit 103.

Circuit Structure of Essential Portions (FIG. 8)

FIG. 8 illustrates only the essential portions of the lighting circuit IA in detail.

DC Voltage Booster Circuit

The DC voltage booster circuit 103 comprises a chopper type DC-DC converter which includes an inductor 112 provided on the positive line 104, an N channel FET 113, a rectifying diode 114 and a smoothing capacitor 115. The N channel FET 113 is provided in the succeeding stage of the inductor 112 between the positive line 104 and the ground line 104', and is switched by the control pulse PS which is sent through the gate driver 111 from the PWM controller 14. The rectifying diode 114, located on the positive line 104, has its anode connected to the drain of the FIT 113. The smoothing capacitor 115 is provided between the cathode of the diode 114 and the ground line 104'. In the DC voltage booster circuit 103, the inductor 112 accumulates energy when the FET 113 is rendered on by the control pulse PS sent through the gate driver 111 from the PWM controller 14, and discharges the accumulated energy when the FET 113 is turned off. A voltage corresponding to the discharged energy is superimposed on the input voltage to boost the DC voltage.

High Frequency Booster Circuit

The high frequency booster circuit 105 comprises a push-pull type self-excited inverter circuit which includes a transformer 116, a choke coil 117, N channel FETs 118 and 118', a feedback winding 119, resistors 120 and 120', constant current diodes 121 and 121', and capacitors 122 and 123. The choke coil 117 is provided on a line connecting the positive output terminal of the DC voltage booster circuit 103 and the center tap of a primary winding 116a of the transformer 116. The N channel FET 118 has a drain connected to a winding-starting end of the primary winding 116a, and the N channel FET 118' has a drain connected to a winding-finishing end of the primary winding 116a.

The FETs 118 and 118' have their sources connected to the ground line 104'.

The feedback winding 119, provided on the primary winding side of the transformer 116, has one end connected via a resistor to the gate of the FET 118 and the other end connected to another resistor to the gate of the FET 118'.

The resistor 120 is inserted between the gate and source of the FET 118, and the resistor 120' is inserted between the gate and source of the FET 118'.

The constant current diode 121 is inserted between the input side end of the choke coil 117 and the gate of the FET 118, while the constant current diode 121' is inserted between the input side end of the choke coil 117 and the gate of the FET 118'.

The capacitor 122 is provided on the primary winding side of the transformer 116, and the capacitor 123 on the secondary winding side of the transformer 116.

In the high frequency booster circuit 105, the FETs 118 and 118' perform a reciprocal switching operation by a voltage induced in the feedback winding 119, thereby producing a sinusoidal AC voltage across the secondary winding 116b of the transformer 116.

Lamp Voltage Detector

The lamp voltage detector 109 comprises voltage-dividing resistors 124 and 124', a capacitor 125, a Zener diode 126, a resistor 127, a Zener diode 128, and an operational amplifier 129.

The voltage-dividing resistors 124 and 124' are associated with the lamp voltage and are provided between the AC output terminals 108 and 108'.

The capacitor 125 and the Zener diode 126 are provided in parallel to the voltage-dividing resistor 124'.

A voltage across the Zener diode 126 is input through the resistor 127 and Zener diode 128 to the non-inverting input terminal of the operational amplifier 129.

The operational amplifier 129 together with a diode 130 provided in the output stage thereof and a capacitor 131 provided between the output terminal and inverting input terminal of the amplifier 129 constitute an ideal diode circuit 132 whose output signal is the lamp-voltage detection signal Se.

The detection signal Se is input to the input terminal 45 of the V-I controller 13, and is sent to the error amplifier 15 in the PWM controller 14 after passing through the voltage buffer 46 and the circuit 52 or 53.

Lamp Current Detector

The lamp current detector 110 comprises a resistor 133 for detecting the lamp current, a capacitor 134, a resistor 135, a Zener diode 136, and an operational amplifier 137.

The resistor 133 is provided on a line connecting the winding-finishing end of the secondary winding 116b of the transformer 116 and the AC output terminal 108'.

The capacitor 134 is provided in parallel to the resistor 133, and a voltage across the capacitor 134 is input through the resistor 135 and Zener diode 136 to the non-inverting input terminal of the operational amplifier 137.

The operational amplifier 137 together with a diode 138 and a capacitor 139, both provided in the output stage thereof, constitute an ideal diode circuit 140 whose output signal is the detection signal Si concerning the lamp current. This detection signal Si is sent through the input terminal 75 of the V-I controller 13 to the error amplifiers 15 and 15' in the PWM controller 14.

PWM Controller

The output signals of the error amplifiers 15 and 15' are input to the comparator 16 and their levels are compared with the level of the triangular wave from the oscillator 17.

A PWM wave output from the comparator 16 has a duty cycle corresponding to the output voltage of the error amplifier 15 or 15', and is sent as the control signal $P_S$ to the gate of the FET 113 in the DC voltage booster circuit 103 through the buffer 82 and the gate driver 111.

What is claimed is:

1. A lighting circuit for a vehicular discharge lamp comprising:

DC-to-AC converting means for converting a DC voltage into an AC voltage and supplying the AC voltage to the discharge lamp;

lamp voltage detector for acquiring a voltage detection signal concerning a lamp voltage of the discharge lamp;

lamp current detector for acquiring a current detection signal concerning a lamp current of the discharge lamp;

voltage-current controller for producing a lamp current control instruction signal generated with respect to the lamp voltage upon reception of the voltage detection signal from the lamp voltage detector, and supplying a control signal to the DC-to-AC converting means so as to minimize difference between the instruction signal and the current detection signal from the lamp current detector, thereby controlling output voltage of the DC-to-AC converting means, the voltage-current controller having at least a lighting acceleration area for producing the lamp-current control instruction signal to permit supply of greater power than rated power of the discharge lamp and a steady power control area for performing steady power control of the discharge lamp with the rated power, as a control area based on lamp voltage-lamp current characteristic; and power change reducing means for suppressing a change in power supplied to the discharge lamp with respect to the lamp voltage at a time of transition to the steady power control area from the lighting acceleration area, thereby shortening a time required for flux of light from the discharge lamp to become stable.

2. A lighting circuit according to claim 1, further comprising:

a protection circuit for cutting off power supply to the discharge lamp upon reception of a signal indicating an abnormal status of the lighting circuit from the voltage-current controller;

an igniter means for activating the discharge lamp;

an inverter circuit including two synchronous DC-DC converters and a synchronous switching element for selecting one of outputs of the synchronous DC-DC converters as an output of the inverter circuit;

a pulse width modulation controller for performing pulse width modulation control in accordance with the voltage detection signals from the lamp voltage detector and the current detection signal from the lamp current detector;

a timing signal generator for generating a timing signal;

a driving means for producing control signals to control the synchronous DC-DC converters in accordance with the timing signal from the timing signal generator and an output of the pulse width modulation controller; and a quiescent controller/lamp current wave shaper for controlling a quiescent period of an output signal of the pulse width modulation controller.

3. A lighting circuit according to claim 2, wherein the igniter means includes two igniter circuits, and a beam selector is provided to selectively activating the two igniter circuits.

4. A lighting circuit according to claim 2, wherein the pulse width modulation controller includes an error amplifying means for receiving the instruction signal and a current limiting signal both from the voltage-current controller and the current detection signal from the lamp current detector, a triangle wave generator for outputting a triangular wave pulse, a comparator means for comparing an output of the error amplifying means with an output of the triangle wave generator and outputting a comparison result to the driving means, and a reference voltage generator for generating a stable reference voltage.

5. A lighting circuit for a vehicular discharge lamp comprising:

a DC voltage booster circuit for boosting an input voltage from a DC voltage input terminal;

a high frequency booster circuit for converting a DC output voltage of the DC voltage booster circuit into an AC voltage;

an igniter circuit for generating a trigger pulse and superimposing the trigger pulse on the AC voltage from the high frequency booster circuit;

a lamp voltage detector for acquiring a voltage detection signal concerning a lamp voltage of the discharge lamp;

a lamp current detector for acquiring a current detection signal concerning a lamp current of the discharge lamp; and a voltage-current controller for producing a lamp current control instruction signal generated with respect to the lamp voltage upon reception of the voltage detection signal from the lamp voltage detector, and supplying a control signal to the DC voltage booster circuit so as to minimize differences between the instruction signal and the current detection signal from the lamp current detector, thereby by controlling an output voltage of the voltage of the DC voltage booster circuit, the voltage-current controller having at least a lighting acceleration area for producing the lamp-current control instruction signal to permit supply of greater power than rated power of the discharge lamp and a steady power control area for performing steady power control of the discharge lamp with the rated power, as a control area based on lamp voltage-lamp current characteristic.

6. A light circuit according to claim 1, wherein the voltage-current controller includes a diode having a forward voltage-current characteristic with a non-linear area in such a way that as the level of the voltage detection signal concerning the lamp voltage becomes large, a voltage across the diode enters the non-linear area, yielding a control curve at a time of transition from the lighting acceleration area to a transition area where the lamp current linearly changes with a given inclination.

7. A lighting circuit according to claim 1, wherein the voltage-current controller includes a Zener diode for providing a constant current control area where the lamp current is constant irrespective of the lamp voltage.

8. A lighting circuit according to claim 1, wherein the voltage-current controller includes a pair of circuit of double systems having an identical structure, one of the circuits performing power control in a transition area where the lamp current linearly changes with a given inclination while the other circuit performing power control in the steady power control area.

* * * * *